US008665955B2

(12) United States Patent
Bourge et al.

(10) Patent No.: US 8,665,955 B2
(45) Date of Patent: Mar. 4, 2014

(54) METHOD OF STORING PICTURES IN A MEMORY USING COMPRESSION CODING AND COST FUNCTION INCLUDING POWER CONSUMPTION

(75) Inventors: Arnaud Bourge, Paris (FR); Joël Jung, Le Mesnil St. Denis (FR)

(73) Assignee: NXP, B.V., Eindhoven (NL)

( * ) Notice: Subject to any disclaimer, the term of this patent is extended or adjusted under 35 U.S.C. 154(b) by 1669 days.

(21) Appl. No.: 11/629,056

(22) PCT Filed: Jun. 7, 2005

(86) PCT No.: PCT/IB2005/051845
§ 371 (c)(1),
(2), (4) Date: Dec. 8, 2006

(87) PCT Pub. No.: WO2005/122587
PCT Pub. Date: Dec. 22, 2005

(65) Prior Publication Data
US 2007/0230919 A1  Oct. 4, 2007

(30) Foreign Application Priority Data

Jun. 11, 2004 (EP) .................................... 04300323

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC ............. 375/240.16; 375/240.01; 375/240.12

(58) Field of Classification Search
None
See application file for complete search history.

(56) References Cited

U.S. PATENT DOCUMENTS

| 5,734,755 | A | 3/1998 | Ramchandran et al. |
| 7,978,764 | B2 | 7/2011 | Jung et al. |
| 2004/0175049 | A1* | 9/2004 | Yamamoto et al. ............ 382/236 |
| 2004/0252768 | A1* | 12/2004 | Suzuki et al. ............. 375/240.24 |
| 2005/0013369 | A1* | 1/2005 | Lee ............................ 375/240.16 |
| 2006/0161427 | A1* | 7/2006 | Ojala ............................ 704/219 |
| 2010/0332700 | A1* | 12/2010 | Fallon ............................ 710/68 |

OTHER PUBLICATIONS

Chaddha N. et al: "A Low Power Video Encoder With Power, Memory and Bandwidth Scalability"; VLSI Design 1996; Proceedings Ninth International Conf. on Bangalore India Jan. 3-6, 1996; Los Alamitos CA USA; pp. 358-363.

(Continued)

*Primary Examiner* — Mehrdad Dastouri
*Assistant Examiner* — Kristin Dobbs

(57) ABSTRACT

The present invention relates to a method of storing pictures in a memory, a picture being divided into data blocks, said method comprising the step of: computing a transform of an input data block for producing a transformed data block comprising a set of n transformed elements, where n is an integer, entropy coding m first transformed elements of the transformed data block for producing an encoded data block, where m is an integer lower than n, computing a cost function on the basis of a weighted sum of a distortion value between the input data block and the encoded data block and a power consumption required for reading or writing the encoded data block in the memory, iterating the entropy coding and cost function computing steps for different values of m, and storing in the memory the encoded data block corresponding to the value of m that minimizes the cost function.

10 Claims, 2 Drawing Sheets

(56) References Cited

OTHER PUBLICATIONS

B. Kapoor, "Low Power Memory Architectures for Video Applications", Proceedings of the 8th Great Lakes Symposium on VLSI, pp. 2-7, Lafayette, LA, USA, Feb. 19-21, 1998.

E. Jaspers, P. de With, "Bandwidth optimisation for video-based consumer systems", IEEE Trans. on Consumer Electronics, vol. 47, No. 4, pp. 885-894, Nov. 2001.

E. Jaspers, "Embedded compression for memory resource reduction in MPEG systems", Proc. of 3rd Benelux IEEE Signal Processing Symposium, Leuven, Belgium, Mar. 2002.

R.P. Kleihorst, R.J. Van Der Vleuten, R. Peset Llopis, "DCT-domain embedded memory compression for hybrid video coders", Journal of VLSI Signal Processing Systems 24, 31-41 (2000).

R.J. Van Der Vleuten, "Low-complexity lossless and fine-granularity scalable near lossless compression of color images", Proceedings of the Data Compression Conference, pp. 477, Apr. 2002.

J. Jung, et al: "Power Scalable Video Encoder for Mobile Devices based on Collocated Motion Estimation" Proceedings of the SPIE, SPIE, Bellingham, VA, US, vol. 5308, Jan. 20, 2004, pp. 45-56, XP002310725 ISSN:0277-786X.

A. Bourge, et al: "Low-power H.264 video decoder with graceful degradation" Proceedings of the SPIE, SPIE, Bellingham, VA, US, vol. 5308, No. 1, 2004, pp. 372-383, XP002334017 ISSN: 0277-786X.

Xiaoan Lu, et al: "Power efficient H.263 video transmission over wireless channels" Proceedings 2002 International Conference on Image Processing. ICIP 2002. Rochester, NY, Sep. 22-25, 2002, International Conference on Image Processing, New York, NY IEEE, US, vol. 2 of 3, Sep. 22, 2002, pp. 533-536, XP010607378 ISBN: 0-7803-7622-6.

R. J. Van Der Vleuten, et al: "Low-complexity scalable DCT image compression" Image Processing, 2000. Proceedings. 2000 International Conference on Sep. 10-13, 2000, Piscataway, NJ, USA, IEEE, vol. 3, Sep. 10, 2000, pp. 837-840, XP010529598 ISBN: 0-7803-6297-7.

\* cited by examiner

METHOD OF STORING PICTURES IN A MEMORY USING COMPRESSION CODING AND COST FUNCTION INCLUDING POWER CONSUMPTION

FIELD OF THE INVENTION

The present invention relates to a method of and a device for storing pictures in a memory, said pictures being processed according to a predictive block-based technique.

This invention may be used, for example, in video decoders, video encoders or portable apparatuses, such as personal digital assistants or mobile phones, said apparatuses being adapted to decode or to encode pictures.

BACKGROUND OF THE INVENTION

Low power consumption is a key-feature of mobile devices. Mobile devices now provide video encoding and decoding capabilities that are known to dissipate a lot of energy. So-called low-power video algorithms are thus needed.

As a matter of fact, accesses to an external memory such as SDRAM are a bottleneck for video devices. This is due both to power consumption issues, as memories are known to be the most power-consuming part of a system, and to speed limitation because of the bandwidth available for the exchanges between a central processing unit CPU and the memory.

In conventional video decoders, the motion compensation unit needs-many such accesses because it constantly points to blocks of pixels in so-called reference frames. To overcome this problem, so-called "embedded compression" has been proposed. Said embedded compression has originally been developed to decrease the memory size at the expense of a quality decrease, due to lossy compression of the reference frames.

An example of embedded compression is shown in FIG. 1 applied to an H.264 video decoder. Said video decoder comprises in series:

a variable length decoding block VLD suitable for decoding an encoded bit-stream BS so as to produce decoded data blocks on the one hand, and decoded motion vectors MV on the other hand, an inverse quantizing block IQ suitable for producing quantized data blocks, an inverse frequency transform block IT, for example in inverse discrete cosine transform block IDCT, for producing inversely transformed data blocks corresponding to a residual error data block e.

The video decoder further includes an adder for adding a motion-compensated data block to a residual error datablock. The motion-compensated data blocks are produced by a modified motion compensation unit MMC comprising in series an embedded encoding unit eENC for producing encoded data blocks, an image memory MEM for storing said encoded data blocks, an embedded decoding unit eDEC and an interpolation filter FIL. The output of the adder is a decoded data block of the output decoded image OF which is then delivered to a display (not represented) and which is also delivered to the embedded encoding unit eENC.

It has been proven in "A Low-Power H.264 Decoder with Graceful Degradation", by A. Bourge and J. Jung, Proceedings Of Electronic Imaging, VCIP, January 2004, that, given some specific requirements, embedded compression techniques help reducing memory transfers and hence power dissipation. One requirement is that the compression ratio maps the memory structure. This requirement means that a compressed block is stored at convenient access points in the memory. For instance the start address of each encoded data block is word-aligned for a SDRAM memory comprising conventionally words having a predetermined length (e.g. 16, 32 or 64 bits), and the size of the encoded data block is optimized if it fits the size of data requests, i.e. bursts of 1, 2, 4, 6 or 8 words are extracted from the memory during one reading cycle.

A conventional way to respect the above requirement could be to set a fixed compression ratio for each block in order to fit in a data burst. For instance, the reference frame is split into data blocks of 8×8 luminance Y and 4×4 chrominance U and V pixels, said luminance and chrominance components being sampled on 8 bits. Therefore, a data block corresponds to 768 uncompressed bits. If we set a compression factor of 3, one data block gets encoded based on a bit budget allocation of 256 bits, which exactly matches the structure of a memory platform with a 32-bit data bus that accepts 8-word bursts.

However, such a fixed compression ratio method is not optimal in terms of visual quality. Indeed, too few bits might be used to correctly encode complex data blocks resulting in a great loss of information, while some less complex data blocks can be encoded without loss with less than 256 bits resulting in a waste of bits.

SUMMARY OF THE INVENTION

It is an object of the invention to propose a method of and device for storing pictures in a memory which allows a better visual quality than the one of the prior art to be achieved while keeping a reasonable power consumption of the memory.

To this end, the method in accordance with the invention is characterized in that it comprises the steps of:

computing a transform of an input data block for producing a transformed data block comprising a set of n transformed elements, where n is an integer, entropy coding m first transformed elements of the transformed data block for producing an encoded data block, where m is an integer lower than n, computing a cost function on the basis of a weighted sum of a distortion value between the input data block and the encoded data block and a power consumption required for reading or writing the encoded data block in the memory, iterating the entropy coding and cost function computing steps for different values of m, and storing in the memory the encoded data block corresponding to the value of m that minimizes the cost function.

The introduction of a cost function based on power-rate-distortion criterion (i.e. a distortion criterion which is dependent on distortion and power consumption) allows a better tradeoff between power consumption, memory bandwidth and visual quality.

Beneficially, the cost function is computed on the basis of a weighted sum of the distortion value, the power consumption and a number of bits of the encoded data block.

The present invention also relates to a storage device implementing such a storage method.

According to an embodiment of the invention, the input data block is transformed and entropy encoded in a first pass, and the resulting encoded data block is truncated at a bit position corresponding to the value of m for which the cost function is minimum, and then stored in the memory.

According to another embodiment of the invention, a variation of the cost function is computed each time a new transformed element is to be added to a current encoded data block, the current encoded data block being stored in the memory as soon as the variation is positive.

According to another embodiment of the invention, the memory is accessed by bursts of i words of predetermined length, where i is a variable integer, and the power consumption is derived from the number of bits of the encoded data block, the power consumption per bit in burst of i words, the value of i, the number of bursts of i words and the length of words. In this case, the cost function is then particularly adapted to the structure and properties of the memory and data bus.

The present invention also relates to a video decoder for decoding a bit-stream, said decoder comprising a decoding unit for providing error data blocks, said storage device for storing encoded data blocks, means for extracting at least one encoded data block from the memory and for decoding said at least one encoded data block so as to deliver a current motion-compensated data block, and an adder for adding a current error data block to the current motion-compensated data block, the output of said adder being provided to the input of the storage device.

The present invention also relates to a video encoder for encoding a sequence of pictures, a picture being divided into input data blocks, said encoder comprising an encoding unit for providing a partially encoded data block, a decoding unit for providing a partially decoded data block from the partially encoded data block, a prediction unit comprising in series a storage device and means for extracting at least one encoded data block from the memory and for decoding said at least one encoded data block so as to deliver a motion-compensated data block, an adder for adding the motion-compensated data block to the partially decoded data block, the output of said adder being provided to the input of the prediction unit, and a subtracter for subtracting the motion-compensated data block from an input data block, the output of said subtracter being provided to the input of the encoding unit.

The invention also relates to a portable apparatus comprising such a storage device.

Said invention finally relates to a computer program product comprising program instructions for implementing said storage method.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention introduces a new way of dealing with power consumption constraints for embedded compression schemes in video decoders and encoders. Embedded compression consists in compressing the reference frames in a predictive video coding scheme, as described before. The invention proposes to perform a bit budget allocation of the embedded compression scheme based on a power-rate-distortion criterion.

The present invention can be applied to any video encoding or decoding device where sequences have to be stored in memory. Indeed, a decoded frame generally needs to be stored in the memory so that it can be later retrieved to predict the next frame(s) through motion compensation. The invention is particularly interesting for reducing the size of the reference image memory while keeping a sufficient overall image quality of the output decoded image. For sake of clarity, we will focus in the following description on the case of a conventional video decoder (for example MPEG-2, MPEG-4, H.264, or the like).

Figure 1:
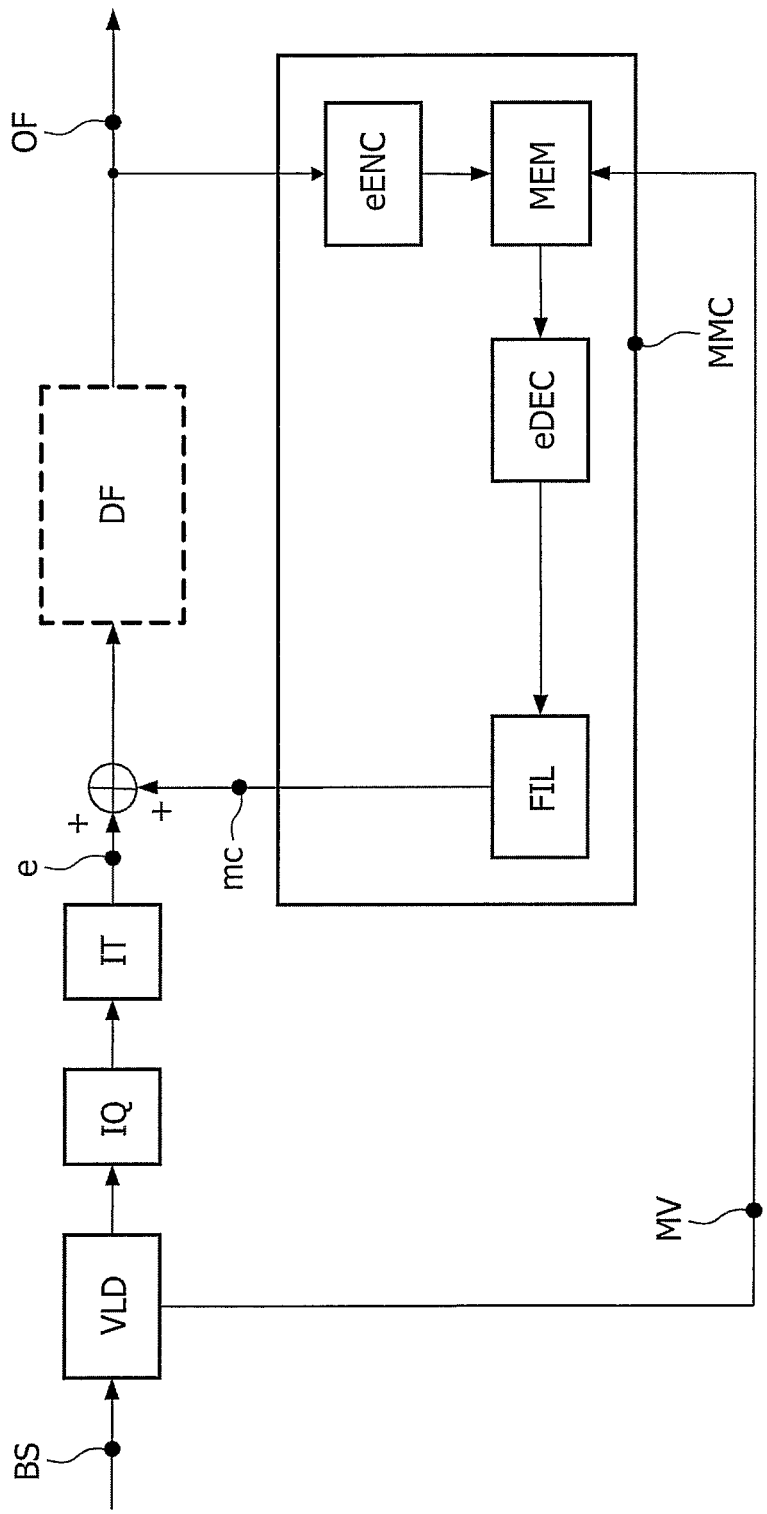
FIG. 1 shows a block diagram of an embodiment of a decoding device.

Let us consider again the video decoder of FIG. 1. Said video decoder is adapted to decode a bit-stream comprising a sequence of encoded pictures, said encoded pictures being divided into encoded data blocks. For that purpose, said decoder comprises:

a decoding unit comprising in series a variable length decoding block VLD, an inverse quantization block IQ and an inverse transform block IT (e.g. adapted to perform an inverse discrete cosine transform IDCT), said decoding unit being suitable for providing error data blocks e from the bit-stream and decoded motion vectors MV, a motion compensation unit MMC for performing motion compensation based on decoded data blocks and motion vectors so as to deliver motion-compensated data blocks, and an adder for adding a current decoded error data block to a current motion-compensated data block so as to deliver a current decoded data block.

The decoded output image OF corresponding to a group of decoded data blocks is then delivered to a display (not represented). The decoding device optionally comprises a de-blocking filter DF, said filter being for example the one proposed in the H.264 standard.

The reconstruction unit of the video decoder in accordance with the invention comprises in series an embedded encoding unit eENC, a memory MEM, an embedded decoding unit eDEC and an interpolation filter FIL.

According to an embodiment of the invention, the embedded encoding eENC unit comprises a transform block for frequency transforming (e.g. using a discrete cosine transform DCT) an input data block so as to produce a transformed data block comprising a set of 64 transformed coefficients (e.g. DCT coefficients) in the case of luminance blocks of 8×8 pixels, each coefficient being sampled on 8 bits.

It further comprises an entropy coding block, for entropy coding m first transformed elements of the transformed data block so as to produce an encoded data block, where m is an integer varying from 1 to n and where n is the total number of relevant transformed elements in the transformed data block. In said embodiment, the entropy-coding block is based on bit plane coding. Said coding encodes DCT coefficients bit plane by bit plane, starting with the Most Significant Bits. Such a coding scheme is for example described in "Low-complexity lossless and fine-granularity scalable near-lossless compression of color images", by R. J. van der Vleuten, Proceedings of the Data Compression Conference, pp. 477, April 2002. According to such a coding scheme, the DC coefficients are losslessly encoded. For the AC coefficients, compression is achieved through a zonal coding: for each bit plane the significance map of the previously insignificant coefficients is represented by the maximum row Rmax and the maximum column Cmax where a bit is equal to 1. The data beyond this zone does not need to be transmitted. Since the energy usually lies in the low frequency coefficients, this technique implies a good bit-rate reduction. Its great advantage is to provide a fine-grain scalability. With said embedded encoding scheme, each transformed element is, a bit of a DCT coefficient and n is equal at most to 512 bits.

The video encoder comprises computing means (not represented), e.g. a processor, for computing a cost function on the basis of a weighted sum of a distortion value between the input data block and the corresponding encoded then decoded data block, a number of bits of the encoded data block, and/or a power consumption required for reading or writing the encoded data block in the memory.

The cost function c(i+1) is computed as follows:

$$c(i+1) = \lambda_1 * \text{size\_in\_bits} + \lambda_2 * \text{distortion} + \lambda_3 * \text{power\_consumption}$$

$$c(i+1) = c(i) + \delta c$$

where:
- size_in_bits is the number of bits of a next encoded data block if a next transformed element a(i+1) is added to the current encoded data block;
- distortion is a computation of a difference (e.g. mean square errors MSE, sum of absolute differences SAD or the like) between the input data block and the corresponding decoded version of the encoded data block; said distortion can also be computed without decoding the encoded block, for example in the case of a conventional encoding chain DCT-Q-VLC, said distortion is derived from a difference, e.g. MSE, between the DCT coefficients before and after quantization, which is equivalent to the MSE between the input data block and the decoded version of the encoded data block;
- power_consumption is an estimation or computation of the power dissipation for writing the encoded data block in the memory and for reading it during a further motion compensation step;
- c(i+1) represents the value of the cost function when a set of (i+1) transformed elements of a next data block have been encoded, c(i) represents the value of the cost function when a set of i transformed elements of the current data block have been encoded, and $\delta c$ is the cost variation between these two values;
- $\lambda_1$, $\lambda_2$, and $\lambda_3$ are weighting factors that reflect the relative importance of each parameter.

According to an embodiment of the invention, the next transformed element a(i+1) is actually added to the bit-stream if and only if the value of $\delta c$ is negative. It both depends on properties of the current data block through the parameters size_in_bits, distortion and power_consumption, and on the encoding strategy through $\lambda_1$, $\lambda_2$, and $\lambda_3$. For instance, a strong value of $\lambda_1$ is needed when there is a strict requirement on the final size of the compressed frame, i.e. it should not exceed a predetermined size, for example the total size of the SDRAM. A large value of $\lambda_2$ means that visual quality is the main decision criterion. Finally, if the value of $\lambda_3$ is high, it means that a gain in power dissipation is more important that a loss of information. There are several advantages in using such an approach.

A first advantage is the visual quality. The use of embedded compression in a video decoder makes the sequence of pictures shift away from the standard decoding (the so-called drift effect), implying a quality degradation that accumulates through the group of pictures. Compared to a fixed compression ratio solution, as described in the prior art, the proposed method allows a more flexible rate allocation, giving more bits to more complex blocks, as in a conventional rate-distortion approach.

Another advantage is the power consumption and the memory structure. Compared to a conventional rate-distortion criterion, the use of the proposed cost function takes into account the power dissipation induced by storing more bits. In practice, this dissipation is calculated (or measured) thanks to known properties of the memory implemented in the device, such as its structure (i.e. the word size), the width of the data bus, the available burst modes, and the energy consumption of an access in each burst mode (read or write). Hence, the bit-rate allocation process cannot favor a small rate-distortion gain that would imply a large energy loss.

Still another advantage is the power scalability. If needed, the weighting factor $\lambda_3$ is automatically tuned according to the level of the device battery. At full charge, the value of $\lambda_3$ is small and the cost function is very close to a conventional rate-distortion criterion, optimizing visual quality. At near-empty charge, power saving is the critical issue and thus the value of $\lambda_3$ is set at a maximum value.

The video decoder comprises a memory controller (not represented) which enables to write in the memory the encoded data block corresponding to the value of m that minimizes the cost function. According to the embodiment described above, the variation of the cost function is computed each time a new element is to be added to the bit-stream. The process stops as soon as the variation is positive. This method is less computational expensive but the process can be trapped in a local minimum of the cost function. According to another embodiment of the invention, the input data block is fully encoded in a first pass, and the resulting bit-stream is locally stored at a temporary location in the memory. For each value of m, the cost function is computed. The bit-stream is truncated at a bit position corresponding to the m first elements for which the cost function is minimum, and then written in the memory. On the one hand this method is exhaustive and thus ensures to find the truncation point with the overall minimum cost. On the other hand it is computational expensive because all the information has to be coded until the last bit and all the values of the cost function have to be computed and stored.

Based on a current decoded motion vector MV, the memory controller enables to read at least one encoded data block from the memory. Then, the embedded decoding unit eDEC is adapted to decode the at least one encoded data block. Depending on the embedded encoding unit, the embedded decoding unit comprises an entropy-decoding block and an inverse transform block IT blocks in series. The at least one decoded data block is finally processed by an interpolation filter FIL so as to deliver a current motion-compensated data block mc, according to a principle known to a person skilled in the art.

According to another embodiment of the invention, the embedded encoding unit eENC comprises a conventional encoding chain including in series a transform block (e.g. using DCT), a quantization block and an entropy-coding block (e.g. a variable length decoding VLC block). In this case, the encoded data block comprises m first transformed elements which are the first m DCT coefficients, and the encoded data block corresponding to the value of m that minimizes the cost function is stored in the memory. The corresponding embedded decoding unit then comprises a conventional decoding chain including in series a variable length decoding VLD block, an inverse quantization block and an IDCT block.

It will be apparent to a person skilled in the art that other compression schemes are possible. For example, the embedded encoding unit may comprise a transform block based on Differential Pulse Code modulation DPCM in series with an entropy-coding block of the VLC type.

In this paragraph, the step of computing the cost function is depicted in more detail. The parameter size_in_bits is known at each step by construction. The distortion value is computed building the truncated DCT coefficients and calculating the difference with the original values (using e.g. an algorithm based on the mean square errors MSE or the sum of absolute differences SAD).

The power_consumption is computed as follows. In modern SDRAM, data can be accessed by bursts of i words (for example i=1, 2, 4, 6 or 8). A word contains N bits (N=32 in general, 16 and 64 are other common values), N is also the width of the data bus. The encoded block is written and fetched using $n_8$ bursts of 8 words, $n_6$ bursts of 6 words and so on. Each burst mode correspond to a different energy consumption. Table 1 gives an example of consumption per access in the case of an SDRAM with a 32-bit data bus width, with a burst of 1 and 8 words. The presented figures are estimations using a specific model.

TABLE 1

| SDRAM consumption estimation per access. | | |
|---|---|---|
| Consumption per access | Burst of 1 word | Burst of 8 words |
| Reading | 19020.7 pj | 63943.2 pj |
| Writing | 17848.8 pj | 54568.0 pj |

One can remark that the consumption of a burst of 8 words is much lower than the consumption of 8 simple accesses. Hence the power cost per transferred bit is different in each mode. For a given number of bits (size_in_bits), we have thus to select a combination of bursts that permits to transfer all the bits with a minimal dissipation according to the following equations:

$$\begin{cases} \sum_{i=1,2,4,6,8} i * n_i * N \geq \text{size\_in\_bits} & (1) \\ P = \sum_{i=1,2,4,6,8} \alpha_i * i * n_i * N \text{ is minimized} & (2) \end{cases}$$

where $\alpha_i$ is the power cost per bit (or per word) in burst mode i, given by the memory properties.

According to an embodiment of the invention, the optimal $\{n_8, n_6, \ldots, n_1\}$ configuration is determined based on the following iterative method, that employs a top-bottom approach. Let us assume that $\alpha_i$ decreases with i, which is always the case in practice. At each iteration, we consider two vector candidates: $n^{(0)} = \{n_8^{(0)}, n_6^{(0)}, \ldots, n_1^{(0)}\}$ and $n^{(1)} = \{n_8^{(1)}, n_6^{(1)}, \ldots, n_1^{(1)}\}$. The first two candidates are:

$n^{(0)} = \{\text{size\_in\_bits}/(8*\text{word\_length}), 0, \ldots, 0\}$ and $n^{(1)} = \{1 + \text{size\_in\_bits}/(8*\text{word\_length}), 0, \ldots, 0\}$.

If $n^{(0)}$ exactly fits size_in_bits, then it is the best candidate and the process stops. Otherwise, $n^{(0)}$ is too small to fulfill the first condition of Equation (1), whereas $n^{(1)}$ is large enough. The corresponding power consumption $P^{(1)}$ is computed. $n^{(1)}$ and $P^{(1)}$ are stored as the best candidates $n_{best}$ and $P_{best}$.

At an iteration s, $n^{(0)}$ and $n^{(1)}$ are built up from the previous $n^{(0)}$ vector at iteration (s−1). The (s−1) values $n_8^{(0)}$, $n_6^{(0)}, \ldots, n_i^{(0)}$ are frozen and definitely chosen. The two candidates have now the following structures:

$n^{(0)} = \{n_8^{(0)}, n_6^{(0)}, \ldots, n_i^{(0)}, n_{i-1}^{(0)}, 0, \ldots, 0\}$ and $n^{(1)} = \{n_8^{(1)}, n_6^{(1)}, \ldots, n_i^{(1)}, n_{i-1}^{(1)}, 0, \ldots, 0\}$, where $n_{i-1}^{(0)} = \delta n/((i-1)*N)$, $n_{i-1}^{(1)} = n_{i-1}^{(0)} + 1$ and $\delta n$ is the number of bits that were missed by the previous $n^{(0)}$ vector at iteration (s−1). If $n^{(0)}$ exactly fits size_in_bits, then it is the best candidate and the process stops. Otherwise, $n^{(0)}$ is too small to fulfill the first condition of Equation (1), whereas $n^{(1)}$ is large enough, as in the first iteration. The corresponding power consumption $P^{(1)}$ is computed. If $P^{(1)}$ is lower than the current $P_{best}$, then $n^{(1)}$ and $P^{(1)}$ are stored as $n_{best}$ and $P_{best}$. The process goes on until the last burst mode is reached or until $n^{(0)}$ exactly fits size_in_bits.

A simpler, though non-optimal, solution consists in directly building the burst configuration through a pre-established rule, e.g. decomposing the encoded data block according to the following principle: $n = \{n_8, n_6, \ldots, n_1\}$ with $n_8 = \text{size\_in\_bits}/(8*N)$, $n_i = \delta n_i/(i*N)$ and $\delta n_i$ is the remaining number of bits; and in calculating the associated power_consumption. This value is then injected in the cost function. Such a solution has the advantage of being very low-cost in complexity, but does not ensure that the selected configuration minimizes power consumption for the transfer (read/write) of a given encoded data block.

A trade-off between the two above solutions would consist in building in advance the optimal configurations for all the size_in_bits values, and store them in a table (for instance in a ROM). Anyway, the first described method is not so complex if the number of available burst modes is limited, which is the case in practice.

In the previous description, it has been assumed that the quantization step has already been selected if any. The resulting bit-stream has been made by truncating it at a relevant point, as described before, for instance after a VLC-encoded Run-Level couple.

According to another embodiment or in addition to the previous description, the cost function can be used to a priori select the quantization step QP. Size_in_bits is estimated using QP and the activity of the current data block (based on an average value of MSE or SAD). Distortion is estimated from the same two parameters. Finally, power_consumption is estimated as described before using the estimated size_in_bits value. The QP value that minimizes the cost estimation is selected.

Figure 2:
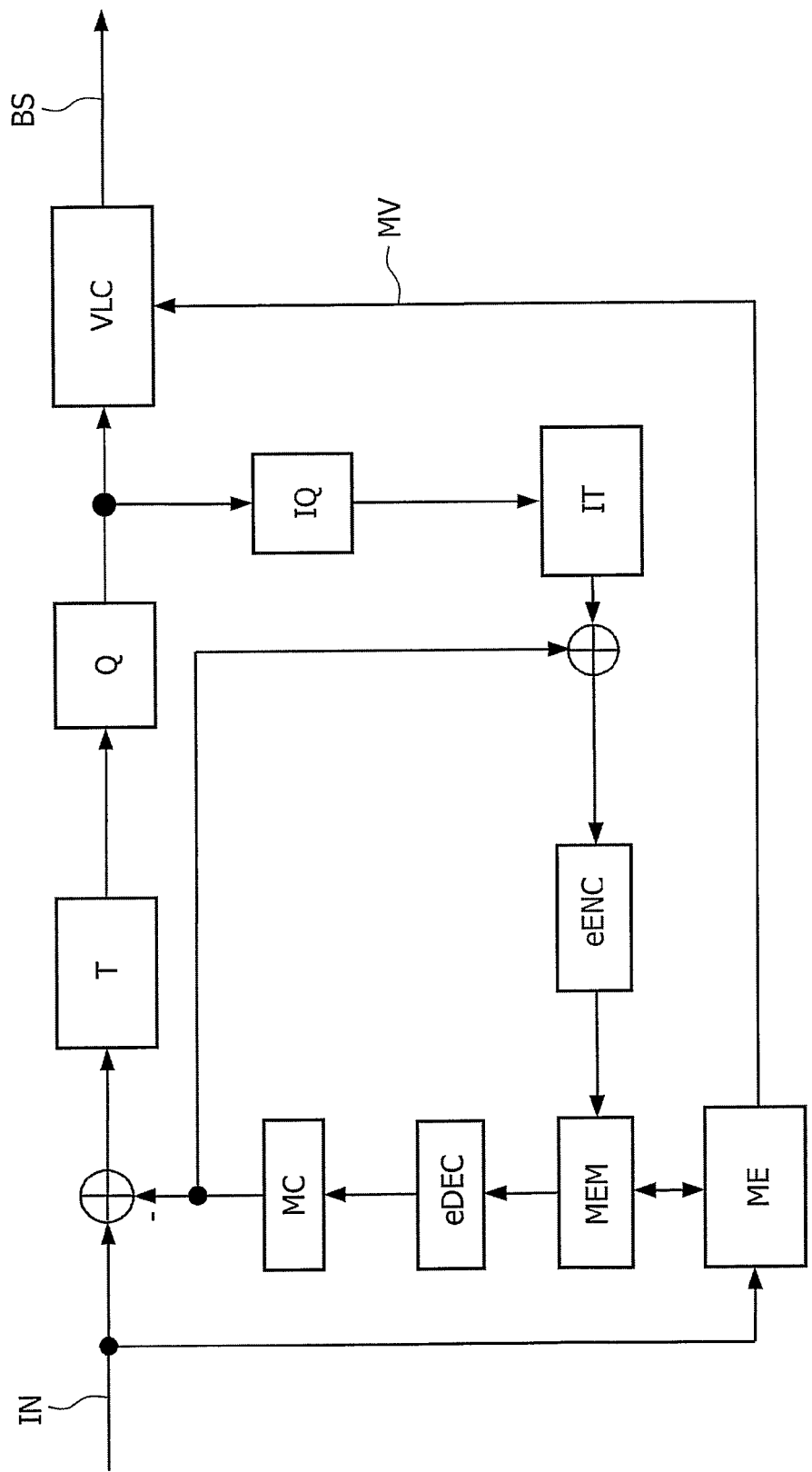
FIG. 2 shows a block diagram of an embodiment of an encoding device.

FIG. 2 shows an example of a video encoding device. Such an encoding device comprises:

an encoding unit comprising in series a direct frequency transform block, for example a direct discrete cosine transform DCT, and a quantizing block Q suitable for transforming input video data IN into partially encoded data blocks; and variable length coding block VLC suitable for producing a bit-stream ES from the partially encoded data blocks;

a decoding unit comprising in series an inverse quantizing block IQ; an inverse frequency transform block IT, for example an inverse discrete cosine transform block IDCT, for providing partially decoded data blocks from the partially encoded data blocks, a prediction unit comprising in series an embedded encoding unit eENC, a memory MEM, an embedded decoding unit eDEC and a motion compensation unit MC for producing motion-compensated data blocks, encoded data blocks produced by the embedded encoding unit being stored in the memory according to the method in accordance with the invention, an adder for adding the motion-compensated data block to the partially decoded data block, the output of said adder being provided to the input of the prediction unit, and a subtracter for subtracting the motion-compensated data block from an input data block, the output of said subtracter being provided to the input of the encoding unit.

Several embodiments of the present invention have been described above by way of examples only, and it will be apparent to a person skilled in the art that modifications and variations can be made to the described embodiments without departing from the scope of the invention as defined by the appended claims. Further, in the claims, any reference signs placed between parentheses shall not be construed as limiting the claim. The term "comprising" does not exclude the presence of elements or steps other than those listed in a claim. The terms "a" or "an" does not exclude a plurality. The invention can be implemented by means of hardware comprising several distinct elements, and by means of a suitably programmed computer. In a device claim enumerating several means, several of these means can be embodied by one and the same item of hardware. The mere fact that measures are recited in mutually different independent claims does not indicate that a combination of these measures cannot be used to advantage.

The invention claimed is:

1. A method of storing a picture in a memory, the picture being divided into data blocks, the method comprising the steps of:
   computing a transform of an input data block to produce a transformed data block comprising a set of n transformed elements, where n is an integer;
   entropy coding m first transformed elements of the transformed data block to produce an encoded data block, where m is an integer lower than n;
   computing a cost function on the basis of a weighted sum of a distortion value between the input data block and the encoded data block and a power consumption required for reading or writing the encoded data block in the memory;
   iterating, for a plurality of different values of m, the steps of entropy coding the transformed data block and cost function computing, wherein the step of iterating includes, for each respective value x of the plurality of different values of m, entropy coding x first transformed elements of the transformed data block for producing an encoded data block, where $1 \leq x \leq m$; and
   storing in the memory the encoded data block corresponding to the value of m that minimizes the cost function.

2. A method as claimed in claim 1, wherein the cost function is computed on the basis of a weighted sum of the distortion value, the power consumption and a number of bits of the encoded data block.

3. A method as claimed in claim 1, wherein the input data block is transformed and entropy encoded in a first pass, and wherein the encoded data block is truncated at a bit position corresponding to the value of m for which the cost function is minimum, and then stored in the memory.

4. A method as claimed in claim 1, wherein a variation of the cost function is computed each time a new transformed element is to be added to a current encoded data block, the current encoded data block being stored in the memory as soon as the variation is positive.

5. A method as claimed in claim 1, wherein:
   the memory is accessed by bursts of i words of predetermined length, where i is a variable integer; and
   the power consumption is derived from the number of bits of the encoded data block, the power consumption per bit in burst of i words, the value of i, the number of bursts of i words and the length of words.

6. A storage device for storing a picture in a memory, the picture being divided into data blocks, said device comprising:
   an embedded encoding (eENC) circuit configured and arranged to:
      transform an input data block so as to produce a transformed data block comprising a set of n transformed elements, where n is an integer; and
      for each value x of a plurality of different values m, where m<n and $1 \leq x \leq m$, entropy code x first transformed elements of the transformed data block so as to produce a respective encoded data block; and
   a computing circuit configured and arranged to:
      for each respective encoded data block, compute a cost function on the basis of a weighted sum of a distortion value between the input data block and the respective encoded data block, and a power consumption required for reading or writing the encoded data block in the memory; and
      store the respective encoded data block corresponding to the value of x that minimizes the cost function in the memory.

7. A video decoder for decoding a bit-stream, the decoder comprising:
   a decoding circuit configured and arranged to provide error data blocks from the bit-stream;
   a storage device as claimed in claim 6 for storing encoded data blocks;
   a circuit configured and arranged to extract at least one encoded data block from the memory and decode the at least one encoded data block so as to deliver a current motion-compensated data block; and
   an adder configured and arranged to add a current error data block to the current motion-compensated data block, an output of said adder being provided to an input of the storage device.

8. A video encoder for encoding a sequence of pictures, each picture being divided into input data blocks, said video encoder comprising:
   an encoding circuit configured and arranged to provide a partially encoded data block,
   a decoding circuit configured and arranged to provide a partially decoded data block from the partially encoded data block,
   a prediction unit comprising in series a storage device as claimed in claim 6 and a circuit configured and arranged to extract at least one encoded data block from the memory and for decoding the at least one encoded data block so as to deliver a motion-compensated data block,
   an adder circuit configured and arranged to add the motion-compensated data block to the partially decoded data block, an output of said adder being provided to an input of the prediction unit, and
   a subtracter circuit for subtracting the motion-compensated data block from an input data block, an output of the subtracter being provided to an input of the encoding unit.

9. A portable apparatus comprising a storage device as claimed in claim 6.

10. A non-transitory computer program product stored on a tangible computer readable medium comprising program instructions for implementing, when said program is executed by a processor, a method as claimed in claim 1.

* * * * *